United States Patent [19]

Campbell

[11] Patent Number: 6,148,402
[45] Date of Patent: Nov. 14, 2000

[54] APPARATUS AND METHOD FOR REMOTELY EXECUTING COMMANDS USING DISTRIBUTED COMPUTING ENVIRONMENT REMOTE PROCEDURE CALLS

[75] Inventor: Randall B. Campbell, Ft. Collins, Colo.

[73] Assignee: Hewlett-Packard Company, Palo Alto, Calif.

[21] Appl. No.: 09/053,571

[22] Filed: Apr. 1, 1998

[51] Int. Cl.[7] ....................................................... H04L 9/00
[52] U.S. Cl. ............................................ 713/200; 713/201
[58] Field of Search ..................................... 713/200, 201, 713/202

[56] References Cited

U.S. PATENT DOCUMENTS 5,497,463  3/1996  Stein et al. ............................... 709/203
6,006,230  12/1999  Ludwig et al. ............................ 707/10

Primary Examiner—Ly V. Hua

[57] ABSTRACT

The present invention generally relates to an apparatus and method of providing security for remote command execution. Remote command execution is a process where a local host processor causes a program to be executed on a remote host processor. The method of security provides for dynamically adapting the security methods in a distributed computing environment communicating using remote procedure calls (RPCs) across a network. The method includes the step of sensing if DCE security or a default security method is to be utilized.

21 Claims, 7 Drawing Sheets

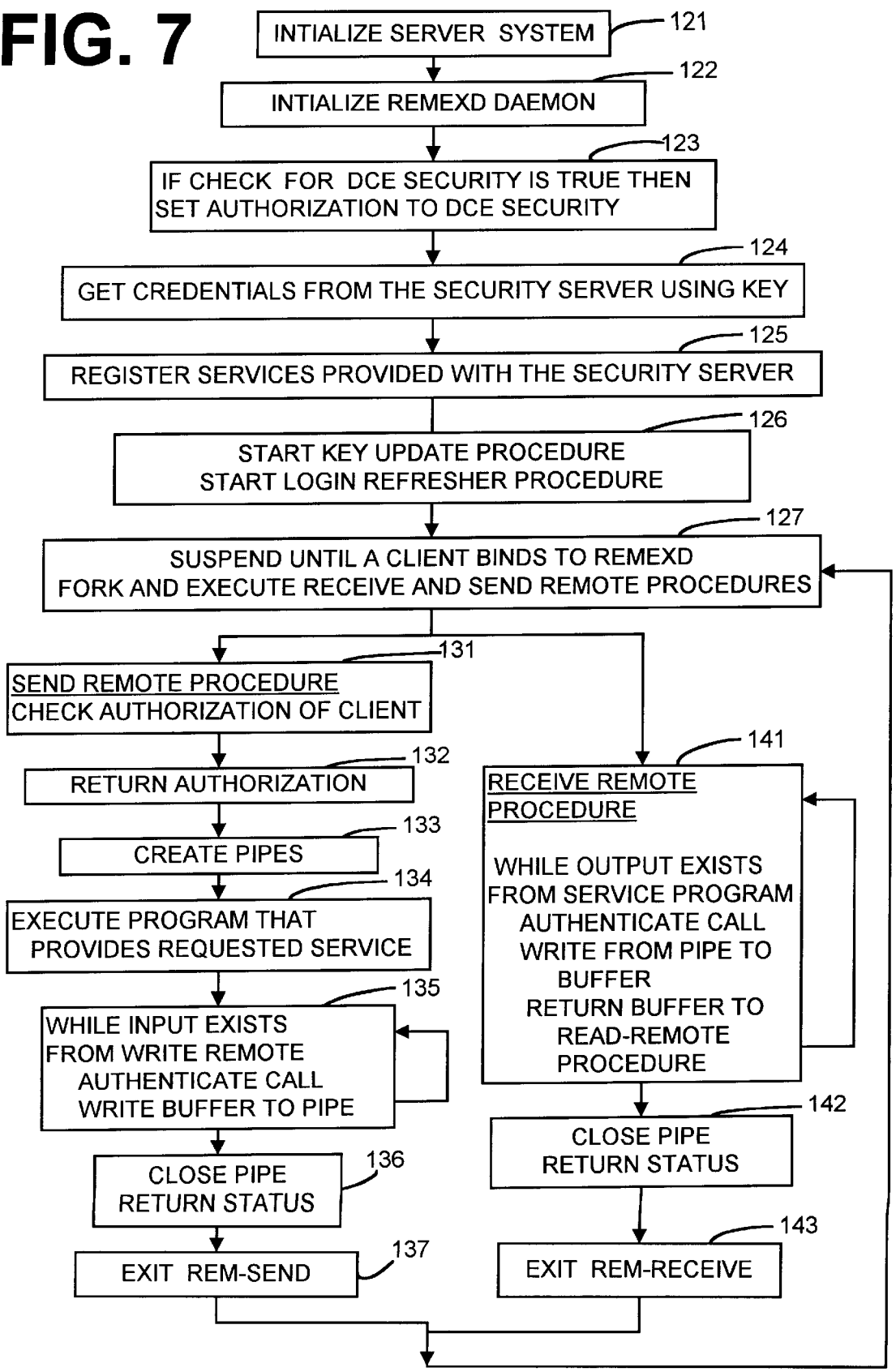

APPARATUS AND METHOD FOR REMOTELY EXECUTING COMMANDS USING DISTRIBUTED COMPUTING ENVIRONMENT REMOTE PROCEDURE CALLS

BACKGROUND OF THE INVENTION

1. Field of the Invention

The present invention generally relates to computers and software, and more particularly, to the security involved in remote command execution. Remote command execution is a process where a local host processor causes a program to be executed on a remote host processor. Usually, the calling process passes data to the remote program and captures the output generated by the remote program on the remote host.

2. Description of Related Art

As known in the computer and software arts, a remote procedure call (RPC) is equivalent to a call to a local subroutine. An application program that makes the call executes the call statement, passes the parameters to the called procedure, and then waits for the results to be passed back from the called procedure. However, unlike a local procedure call, the procedure called by the RPC does not reside in the application program or may not even reside in the computer running the application program, but instead resides on a remote computer in a network. It is also known that an RPC can be used for remote command execution.

In unix computing, the existing art for executing commands remotely consists of the Berkely Software Distribution Unix (BSD) 4.3 family of commands and procedure calls (rsh (remsh), rcmd, rexec) and the RPC-based on/rexd combination developed by Sun Microsystems, Inc.

The BSD facilities rely on a programming interface known as "sockets," wherein a two-way connection is created between the client and the server. "On" and "Rexd" are based on remote procedure calls, which is a programming interface wherein procedure calls are made transparently on the client, but execute on the server.

In all cases, a "daemon" program running permanently on the server system has the responsibility of creating or denying the connection from the client application to the service provider; or server application.

A key difficulty with remote command execution is that of security. How does one ensure that only allowed users from allowed client systems are permitted access to the server application, and also ensure that access cannot be perverted to malicious purposes?

The method used in BSD 4.3 unix works as follows. (1) The server checks the client's TCP port (an address associated with a socket, to ensure that it is a reserved port. (2) The server reads the following inputs from the client: the client-side user name, the requested server-side user name, and the command to be executed. (3) The requested user name on the server is looked up in the password database on the server system. If there is no entry, then the connection is terminated. (4) One of two authorization files (/etc/hosts.equiv, and the .rhosts in the user's home directory) are checked for the client host name and the client user name.

If all these checks pass, execution of the command is allowed.

The RPC-based remote execution facility produced by Sun Microsystems, Inc. has inherently almost no security—if the same user ID exists on the server as on the client, execution is allowed. The one significant restriction is that no remote execution is allowed by root. There is a command line option to rexd that causes it to rely on the BSD 4.3 security mechanism described above.

The prior solutions for remote command execution suffer from the following security weaknesses. It will be shown later how the present invention addresses and overcomes certain of these difficulties. A problem with the prior solutions is that the host addresses and user names are sent in plain text that is very open to "spoofing". A knowledgeable hacker can transmit packets pretending to be from another machine or another user.

Another problem is that the authentication is weak, because the server accepts the user and host name as identified in the transmission without proof.

Yet another problem arises in cases where passwords are required. They are transmitted over the network in clear text, which is subject to interception.

Another problem is that the authorization files not very well protected. The files .rhosts and /etc/hosts.equiv are used to circumvent sending passwords, but they are not well protected. The /etc/hosts.equiv file is generally write-protected to root only, but individual users' .rhosts are often not well-protected, and it is hard to enforce strong protection. They can be modified to allow unintended users to execute commands.

Furthermore, there is the problem that no state is maintained since each command transaction stands alone. This leaves these methods open to "replay attacks" wherein a hacker captures a valid network packet, alters some details (like the name of the user, or the command to execute) and resends it.

In addition, there is the problem that there are few options for additional security. The file /var/adm/inetd.sec can be used to limit accessibility of the services to a specific set of hosts. There are no options to encrypt data or obtain stronger authentication. There are additional levels of security that can be imposed on unix systems at the operating system level. These are special versions of unix, usually developed independently by vendors to meet the government B2 Security requirement. These are outside the scope of the present invention, as they require a special version of unix.

Another method of imposing stronger security on unix operations without modifying the base operating system is the Kerberos system. Kerberos uses a "third party," a separate computer designated as the security server. All "principals" in the distributed network must be known to the security server, and all have passwords, or keys, known only to themselves and the security server.

Each principal (which may be a user or a program) must obtain a set of credentials, known as a ticket, from the security server before it may perform any functions over the network. In addition, before a client can connect to a server, it must obtain a different, specific ticket from the security server which it presents to the server. All keys and tickets are encrypted in such a way that only the intended recipient can decrypt them.

However, until now, network systems have lacked the ability to provide flexible and heightened security for remote procedure calls in the distributed computing environment (DCE).

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method for remotely executing commands using remote procedure calls (RPCs) in the distributed computing environment (DCE). In accordance with one aspect of the invention, an apparatus and method dynamically adapt the security methods in a distributed computing environment communicating using remote procedure calls (RPCs) across a network. The apparatus and method implement the function of sensing if DCE security or a default security method is to be utilized.

In accordance with the one embodiment of the method of the present invention, enhanced security is afforded by providing the host identification and user name in RPC packet in binary form. These data items can still be extracted, but not as easily.

In accordance with another embodiment of the present invention, authentication is strengthened, even in the default security mode by use of a shared secret key and in the enhanced security mode by using the very strong Kerberos-based authentication.

In accordance with another embodiment of the present invention, a single system-level authorization file is root-protected, and limits client access to a single system.

In accordance with another embodiment of the present invention, the default security mode, a non-repeating value field in the security structure is also encoded with the secret key. This non-repeating value field effectively prevents replay attacks. In the enhanced security mode, the Kerberos ticketing system performs this function.

An alternate embodiment provides an apparatus and method for implementing stronger security in the default mode than the prior art, but can go beyond that by sensing its environment, and if in a properly configured DCE cell, makes use of Kerberos-style third-party authentication and authorization, and authenticates every packet.

BRIEF DESCRIPTION OF THE DRAWINGS

The accompanying drawings incorporated in and forming a part of the specification illustrate several aspects of the present invention, and together with the description, serve to explain the principles of the invention. In the drawings:

FIG. 7 is a flow chart of the process for the DCE security system operating in the server system of the present invention, shown in FIG. 3.

DETAILED DESCRIPTION OF THE PREFERRED EMBODIMENT

Figure 1:
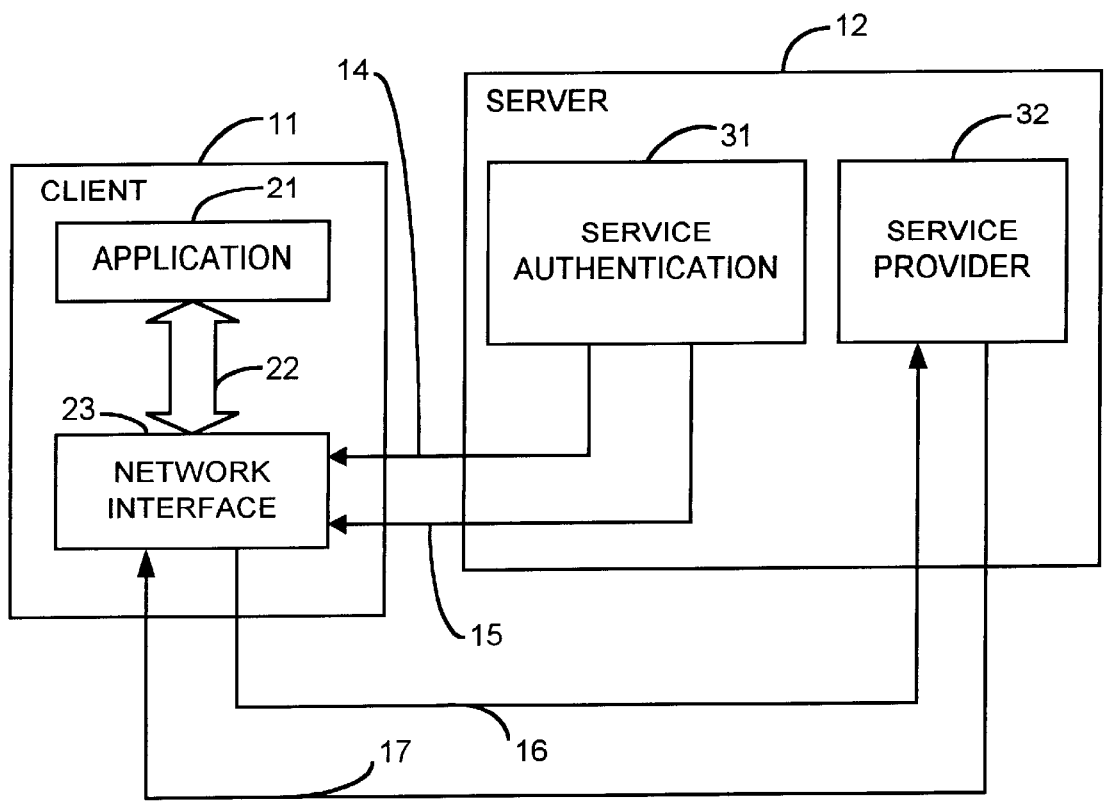
FIG. 1 is a block diagram of the client/server system utilizing the 4.3 BSD security system of the prior art.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Turning now to the drawings, FIG. 1 is a block diagram of the client server system utilizing the 4.3 BSD security system of the prior art. Client 11 comprises an application 21 that requests server functionality utilizing the communication link 22 to the network interface 23 that communicates with server 12.

The 4.3 BSD routines running in a unix environment generally require a host to prove its identity and trusts the host identification of a user on that host. The hosts are identified by their Internet addresses and trusted hosts are assumed to identify correctly the user on that host requesting a particular service. The 4.3 BSD security scheme uses a concept of reserved Internet ports wherein the remote procedure binds with a reserved port. However, there is nothing to stop any user from knowing the root password on a station from binding to a reserved Internet port.

The authentications based upon the Internet address includes both the 32 bit Internet network identification (ID) and the host ID as well as the 16-bit TCP port number. The steps for the server security include: (1) The check of the client's TCP port to verify that it is a reserved port on link 14. This port corresponds to a connection in the socket. If not an authorized socket, the connection is terminated. (2) The server reads the following three strings from the client user name, the server user name, and the command string to be executed on the remote host in the server authentication functionality 31. (3) The server user name is looked up in the password file by the server authentication functionality 31. If no entry is found, then the connection is terminated. (4) If the password file entry does contain a password, the client host name and the server user name are verified by searching a standard authorization file 31 on the server. Standard authorization files are not encrypted.

The application 21 accomplishes the request for server functionality by the use of a programming interface known as sockets. The application 21 writes its data to the client side of the socket connection 16. The service provider reads the data from its end, and writes its output on its end of the socket connection 17.

The network interface determines which network transport (i.e., TCP/IP or UDP/IP) to use for the communication, and searches the directory services for the server's host directory and then connects to and transmits through a socket to the server over link 16.

First, the client sends a message across line 14 to the server 12 service authentication module 31. The server 12 service authentication module 31 checks the authentication of the client base. Next, the client sends the data link on 16 requesting the particular service to be performed. The server performs the requested service and return the results 17 to the client requesting the service.

Figure 2:
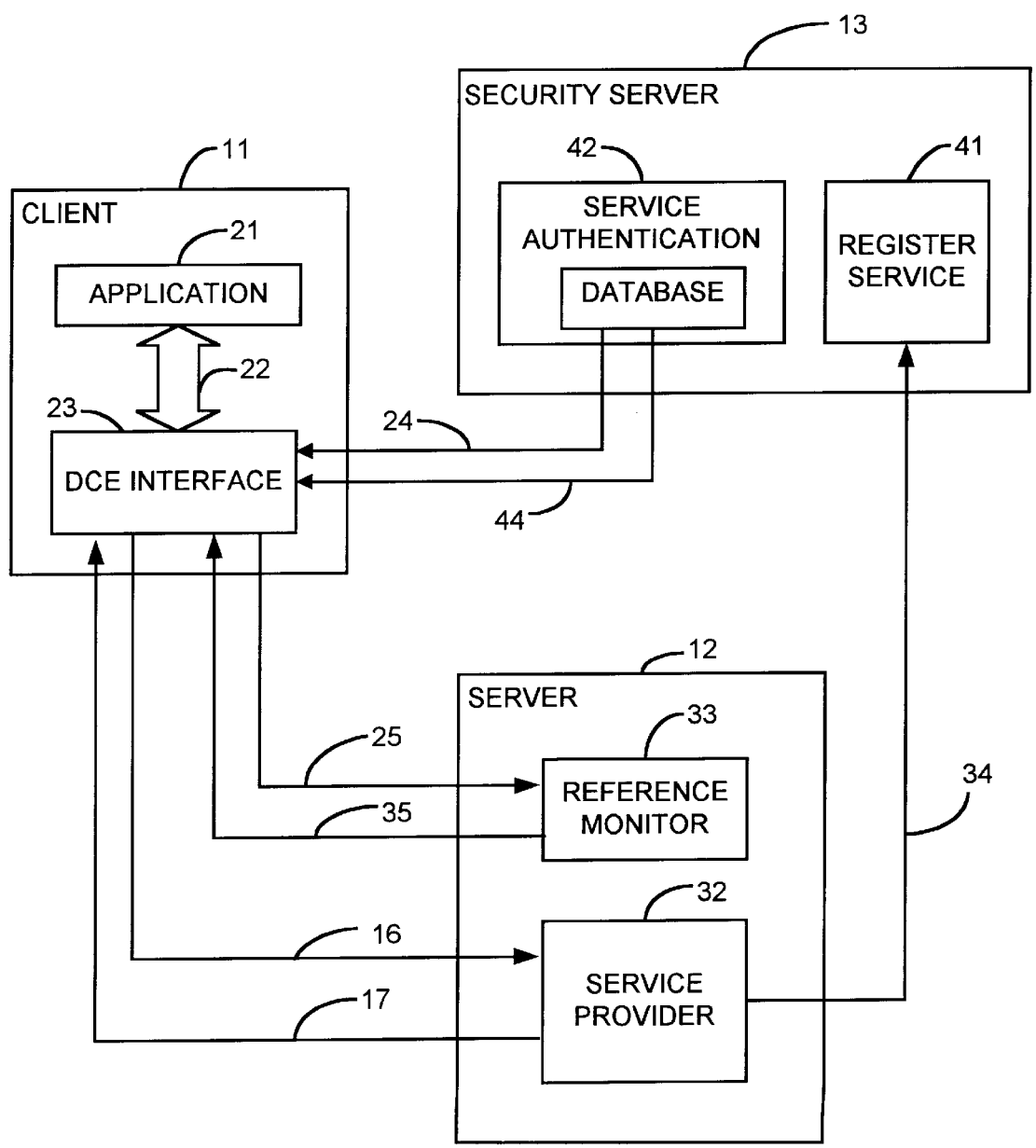
FIG. 2 is a block diagram of the client/server system utilizing the Kerberos security system of the prior art.

Illustrated in FIG. 2 is a block diagram of the client server system utilizing the Kerberos security system of the prior art. Client 11 is comprises an application program 21 communication link 22 to a DCE interface 23. The steps performed to execute a remote procedure call in a Kerberos security system are as follows. First, the user logs into a client workstation by entering their login name at the unix login prompt.

Next, as a part of the login sequence and before prompted for the password, the message 24 is sent across the network to the Kerberos authentication security server 13. This message 24 contains the user login name along with the name of one particular Kerberos server. Since the message contains only two names, it need not be encrypted. The names are not considered secrets and everyone has to know the other names of client and servers to communicate.

Then, the authentication security server 13 looks up the user login name and the service name in the Kerberos database and obtains an encryption key for each. The encryption keys used by the Kerberos are one-way encrypted passwords similar to what is stored in the password entry field of a normal unix password file. The authentication security server 13 forms a response 44 back to the client login program on the workstation. This response contains a ticket that grants the user access to the requested server 12. The concept of the ticket and what makes up the ticket is the core of the Kerberos system. Tickets are always sent across the network in an encrypted form. They are never sent in clear text. The messages and the ticket is encrypted using the client's encryption key and encryption password which is contained in the Kerberos database on security server 13 in the service authentication module 42.

Next, the client login program receives the enrypted message 44 and only then prompts the user for their password. This clear text password is first processed in the standard unix one-way encryption algorithm and as a result is used to encrypt the ticket message 44 received. Then, the clear text password is erased from memory leaving a sealed ticket that is encrypted with the session key. At this point, the client 11 software saves the copy of the ticket and the session key. To request a specific service, the client 11 must obtain a ticket for the particular service. To obtain a ticket, the client 11 software has to contact the Kerberos ticket granting server 13.

Then, the workstation builds a message 25 to be sent to the ticket granting service. This message consists of a sealed ticket, a sealed authenticator and an inserver name. The sealed authenticator includes the client workstation login name, the workstation net address, and the current time. This message is then sent to the ticket granting service and the server 12.

Next, the ticket granting service of the server 12 receives the message 25 and encrypts the message using the encryption key. From the unencrypted message the server 12 obtains the session key. This session key is used to encrypt the ticket from the sealed authenticator. There are multiple items for the ticket granting service to check for validity, the login name of both the ticket and the authenticator, and the server name in the ticket. The server also compares the network address of the ticket, the authenticator, and the received message. The server 12 then looks up the end server name from the message in the Kerberos database and obtains the encryption key for the specified service.

Then, the ticket granting service forms a new random session key and then creates a new ticket based on the requested end service name and the new session key. The ticket is sealed using the encryption key for the requested end server. It is then sent to the workstation.

Soon afterward, the workstation receives the sealed message 35, decrypts it using the session key that it knows. From this message it again receives a sealed ticket that it cannot decrypt. This sealed ticket is what it has to send to the end service server.

Then, the client workstation builds an authenticator including the login name, workstation, network address, and the current time and seals it using the new session key. Finally, the client workstation is able to send a message 16 to the end service server. This message is not encrypted since both the ticket and the authenticator within the message are sealed and the name of the end server is not a secret.

Last, the end service server receives this message and decrypts the sealed ticket using its encryption key which only the end server and the Kerberos security server know. The end service server 12 then uses the new session key contained in the ticket to encrypt the authenticator and do the requested service processing. The end service server 12 sends the results of the requested service processing in message 17 back to the client.

Figure 3:
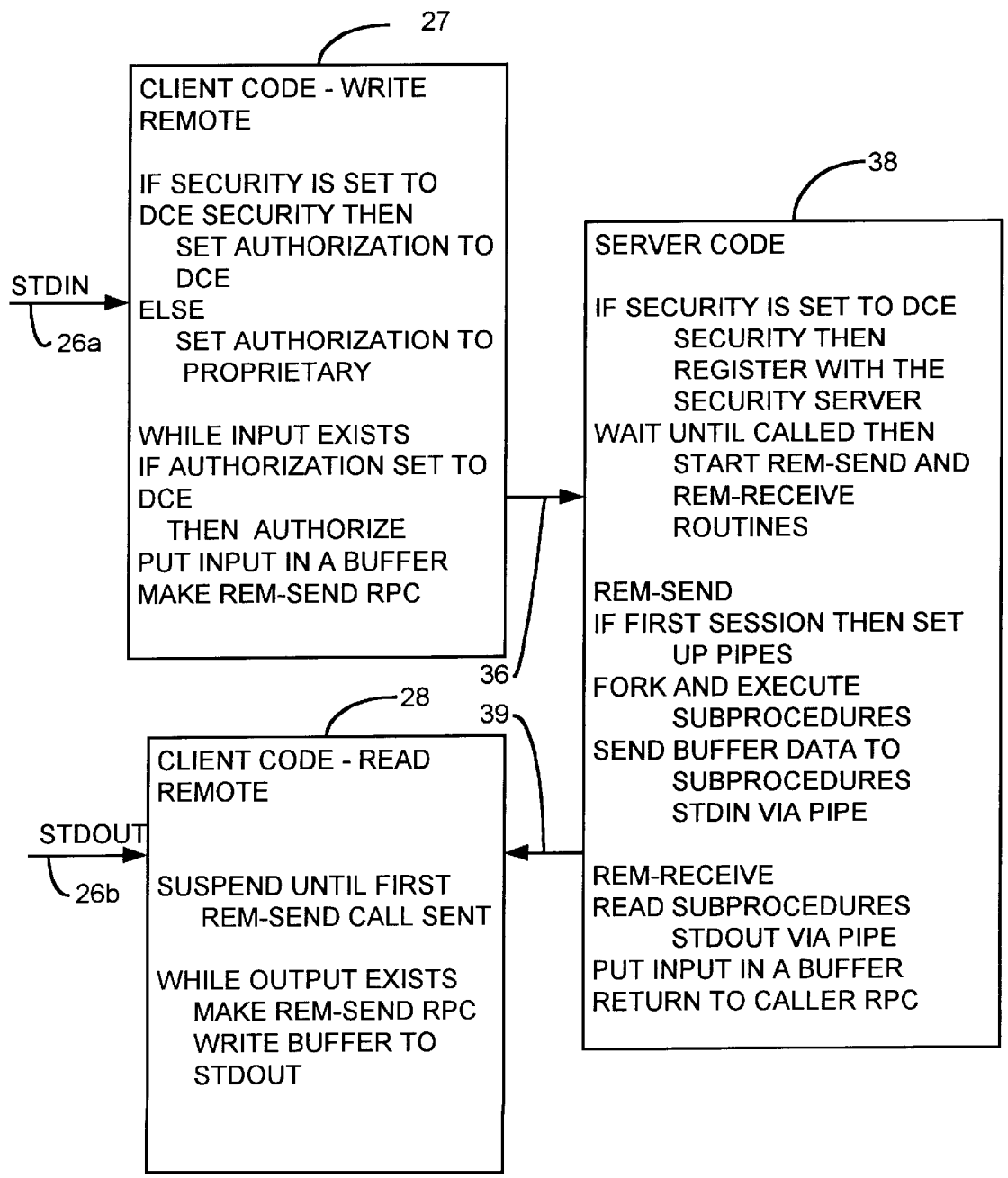
FIG. 3 is a block diagram of the client/server system utilizing the dynamic security system and method of the present invention.

Illustrated in FIG. 3 is the security system of the present invention. A message from application program 21 sent across communication link 22 creates a client code write remote stub 27. This client code write remote stub first checks to see if the client security is set to DCE security. If the client code is set to DCE security, then the authorization is set to DCE. Otherwise, the authorization is set to the default security system.

Then, while input exists from the client 11 application 21, the client code write remote stub processes a loop that first checks to see if the authorization is set to DCE. If the security is set to DCE, then an authorization packet is sent across in 36. The next step in the loop is to put the input received from this stdin 26a into a buffer and perform a remote send (i.e., a remote procedure call) 36 to the server 12.

The server 12 code stub program 38, upon initialization checks to see if security is set to DCE, then if so, registers 34 with the security server 13 (in FIG. 2). Then the server code stub 38 waits for a call from a client code sub write remote stub program. Once a remote send RPC is received, the server code 30 program 38 forks and executes the remote send and remote receive routines in parallel.

The remote send procedure first checks if data received is the first session. If so, then remote send sets up its communication pipes. Next, the remote send sub routine remote thread forks and executes subprocedures to perform the actual service. The remote send sub procedure then sends the data received in the buffer from the client code write remote stub 27 across line 36 to the appropriate sub procedures stdin via the pipe created in the initialization step.

The remote receive stub program, upon execution, reads the stdout via pipe from the sub procedures executed in the remote send. The remote receive stub puts the data from the sub procedures into a buffer which is then returned to the client caller remote procedure call across line 39. The client code read remote stub program 28 after initialization is suspended until receiving the first turn of data from the server code remote receive program. Then, while the client code 28 read remote 28 receives data from the server, it receives the data from the remote procedure call and it writes the data in the buffer from the remote procedure call to the stdout for return to the client application program 21. The stdout data is sent via line 26b.

Figure 4:
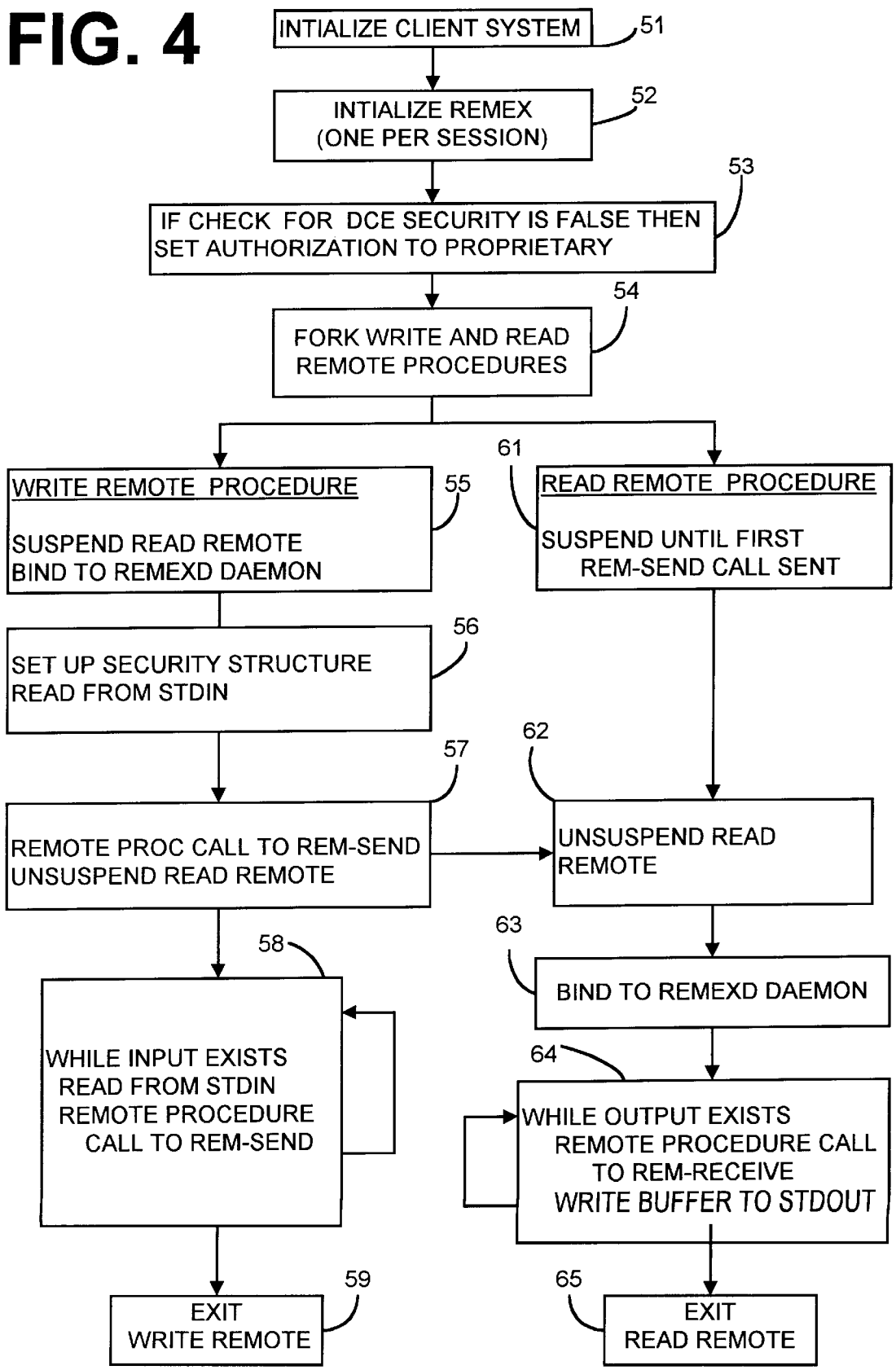
FIG. 4 is a flow chart of the process for the default security system operating in the client system of the present invention, as shown in FIG. 3.

Illustrated in FIG. 4 is the process for the client system security initialization and security process for remote procedure calls in more detail with regard to the selection of default security.

As the client system is initialized in step 51, this includes operating system and all other initialization maintenance program loading. Step 51 also includes the execution of the client application program 21 (FIG. 1).

Upon the client application program 21 execution of a remote procedure call results in the initialization of the remote execution client (referred to below as "remex") which is one per session in step 52. The remote execution client ("remex") performs the following actions, reads its stdin, which is being fed by the client application program, writes what it reads to the remote execution server by remote procedure calls, receives the output from the remote execution server by another RPC, and writes the output to its stdout, where it is picked up by the client application program. Remex essentially functions as a data pipeline; the data being passed back and forth is opaque to it, with the exception of internally-generated error messages.

After initialization there is a check to see if the security for the remote procedure call is DCE. This is accomplished by the application checking, via a DCE API, whether it's in a configured DCE cell. If so, it then attempts to get a ticket using an internally-derived principal name. If these checks succeed, and it is able to verify its identity with the Security Server, then the DCE security method is utilized and the process uses the flowchart in FIG. 6. Otherwise, the authorization is set to the default security method at step 53. The default security method is accomplished by creating an encoded key by concatenating a password, shared with each of the remote clients, with a pseudo-random number. The resulting string is then encrypted using a library call. The first two characters of the encrypted result (which contain the "seed" used to generate the encryption) are stripped off. The password is stored internally in an encoded format (as an array of shorts, with the high bit of the character value set), to make it hard to read from the executable.

This encrypted key, the pseudo-random number, the user name, and the hostname (of the server) are all placed in fields in a custom binding handle that is used to bind with the remote. The security check is done when binding takes place at the beginning of a session by the first outgoing RPC. Subsequent calls within the same session are not re-authenticated.

Next, the write and read remote threads are created and executed at step 54. The write remote and read remote threads execute in parallel and after completion of the remote procedure call, each of the write remote and read remote threads are terminated.

The write remote thread, upon execution, first suspends the read remote thread and binds to the remexd daemon of the server system at step 55. Next, the write remote thread sets up the security structure for the default security being used for the remote procedure call and reads from stdin at step 56. The write remote thread performs a remote procedure call to rem-send in the server 12 system (FIG. 1) and unsuspends the read remote thread at step 57. At this time, the read remote thread is unsuspended and processes and this will be described in later paragraphs.

The write remote thread performs reading of the stdin file and remote procedure calling of the rem-send until input from stdin file is empty at step 58. Once input from standard in file is empty, then the write remote thread exits at step 59.

Upon execution of the read remote thread, the read remote thread suspends until the first rem-send call is sent to the server. This is done because until there is a remote procedure call to the server, there can be no returning of data from this server based on the remote procedure call 4 for service. At which time the write remote thread calls rem-send, the read remote thread unsuspends itself at step 52. The read remote thread binds itself to the remexd daemon at step 63. While input exists from rem-send in server 12 (FIG. 1), the remote thread continues to output data received from the server to the stdout until output file is empty. Then the read remote thread exits at step 65.

Figure 5:
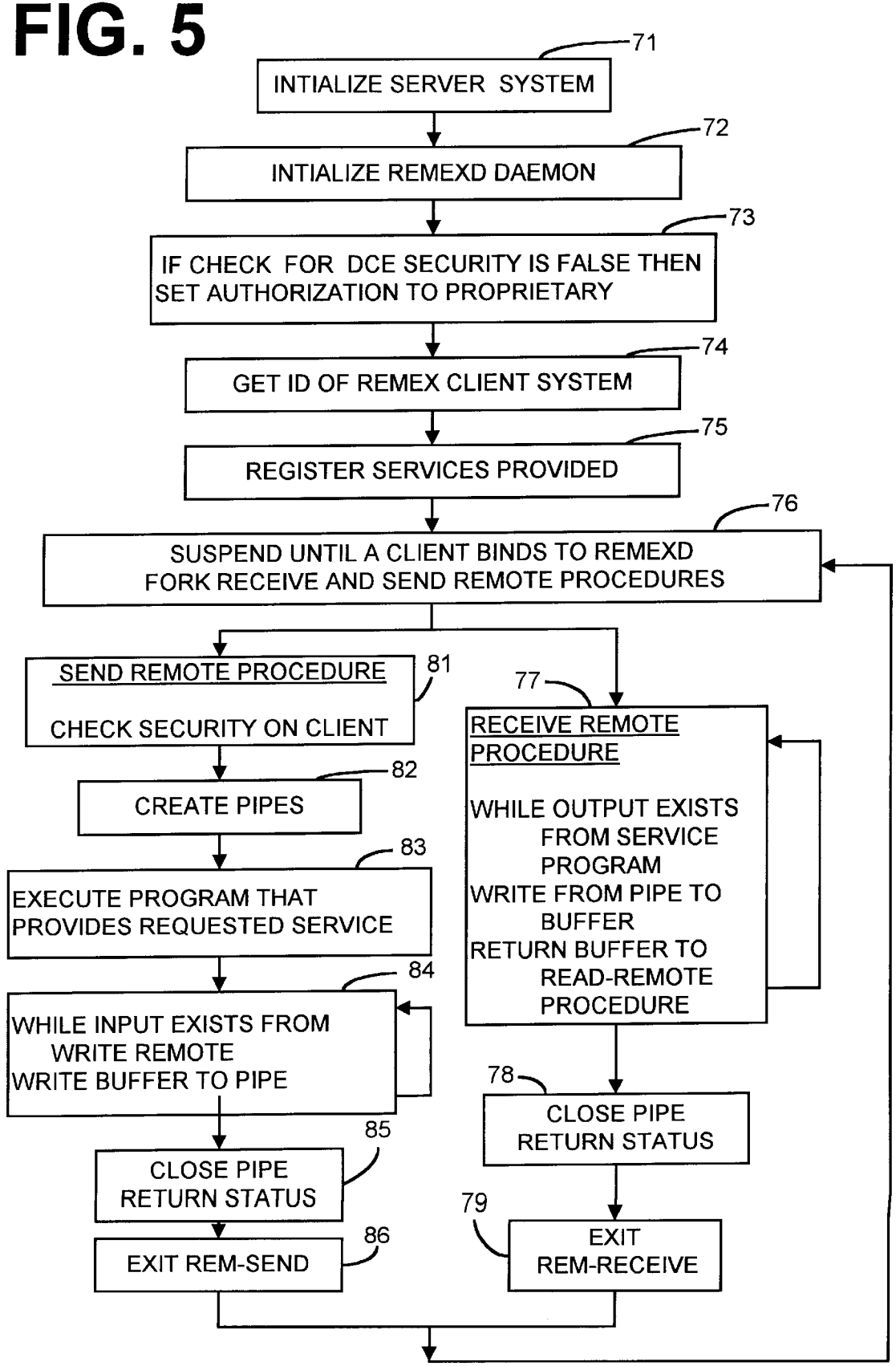
FIG. 5 is a flow chart of the process for the default security system operating in the server system of the present invention, shown in FIG. 3.

Illustrated in FIG. 5 is the server processing in the instance where default security is provided for remote procedure calls. Initialization of the server system is first performed at step 71. Next, the initialization of the remote execution server daemon is performed at step 72. The remote execution server daemon, more popularly known as "remexd," is a daemon that runs on the server systems 12, that listen for DCE remote procedure calls from remex on the client systems 11.

Upon startup of the daemon (remexd) on the server system, it obtains the name of the single allowed client from a root-protected configuration file, and is invoked with that client system as a parameter. Remexd performs the following actions. First, it registers its interface with the local rpcd (or dced) and invokes one of the registered procedures upon receipt of a call. Remexd also resets the stdin and stdout, and then forks and executes the remote send and receive procedures.

Remexd is the remote end of the data pipeline described above in connection with remote execution client (remex). The remexd daemon manages the end point map or the server step code that communicates directly with the client subcode. The RPC daemon resides at well-known end points so the client can find it and communicate requests for service. In the initialization, the remexd daemon registration of services provided are performed. Also, registration of the protocol versions that the server will use for remote procedure call is performed. The protocol sequence identifies a single type of communication protocol, for example, TCP/IP or UDP/IP. Protocol registration causes the servers to create its end points. The clients get and use these end points to communicate with the server. The server then advertises its server location to clients by putting the end point information into a directly serviced database and storing the binding information into an application specific database and the creation of an end point map. Then, client applications can register the server address end points in a local end point map, thus enabling the clients stub code to search the end point map to get the proper addresses on the host and communicate directly with them as discussed with regard to FIG. 1.

Next, the server system checks to see if DCE security is to be used in the remote procedure calls, and if this check for remote DCE security is false, then the server daemon sets authorization to the default security system at step 73.

Next, the identification of the remexd client system is obtained in step 74. Registration of server services provided are performed at step 75. The server remexd is then suspended until a client binds to remexd to have services performed. Once the client binds to the remexd daemon, then the remexd daemon forks and executes a receive and send remote thread at step 76. The send remote thread, upon initialization, checks the security of the client at step 81. Remexd does the following checks when using the default security system.

First, it compares the source hostname with its knowledge of the registered server, (supplied as a command line argument to remexd on startup). Next, it verifies that the sending user name is the official user. Remexd then checks that the pseudo-random number is not in a list of the last N that it has received. The pseudo-random number having been stored in a circular array in the remexd memory space, each new one replacing the oldest number in the array. Remexd further constructs a string of the shared password (which is stored in an encoded fashion, so it can't be read using the strings command) and the pseudo-random number, and encrypts it using an encryption algorithm, and strips the first two characters. This result is compared with the encrypted string in the custom binding handle. If any of these checks fails, the call is rejected and no session takes place. The failed attempt is logged in the security log, along with all details.

The send remote thread next creates pipes at step 82. These pipes created at step 82 allow communication from the send remote thread with the service providing the program that actually provides the requested service. The program that provides the requested service is executed at step 83. While input exists from the client, the send remote thread write takes the data from the buffer received from the client process and writes it to the pipe created in step 82, thereby providing the data to the program that provides the requested service.

Once the input from the client write remote thread ceases, the send remote thread closes the pipe to the service providing program, returns statuses to the write remote thread and exits the send remote thread at step 86, and returns to stop 76 to wait for the next client to request service.

The remote thread executed at step 77 initializes, and while output exists from the program that provides the requested service, writes the data received from the program that provides the requested service and writes it to a buffer. This buffer is then returned to the client read remote thread in step 77. As long as there is data output from the program that provides the requested service, step 77 will loop until output from the program that provides the requested service ceases.

Once the output from the program that provides the requested service ceases, the receive remote thread closes the pipe to the program that provides the requested service and returns status to the client read remote thread of FIG. 4 in step 78. The receive remote thread then exits at step 79 and returns to a suspended state until the next client binds to the remexd daemon at step 76.

Figure 6:
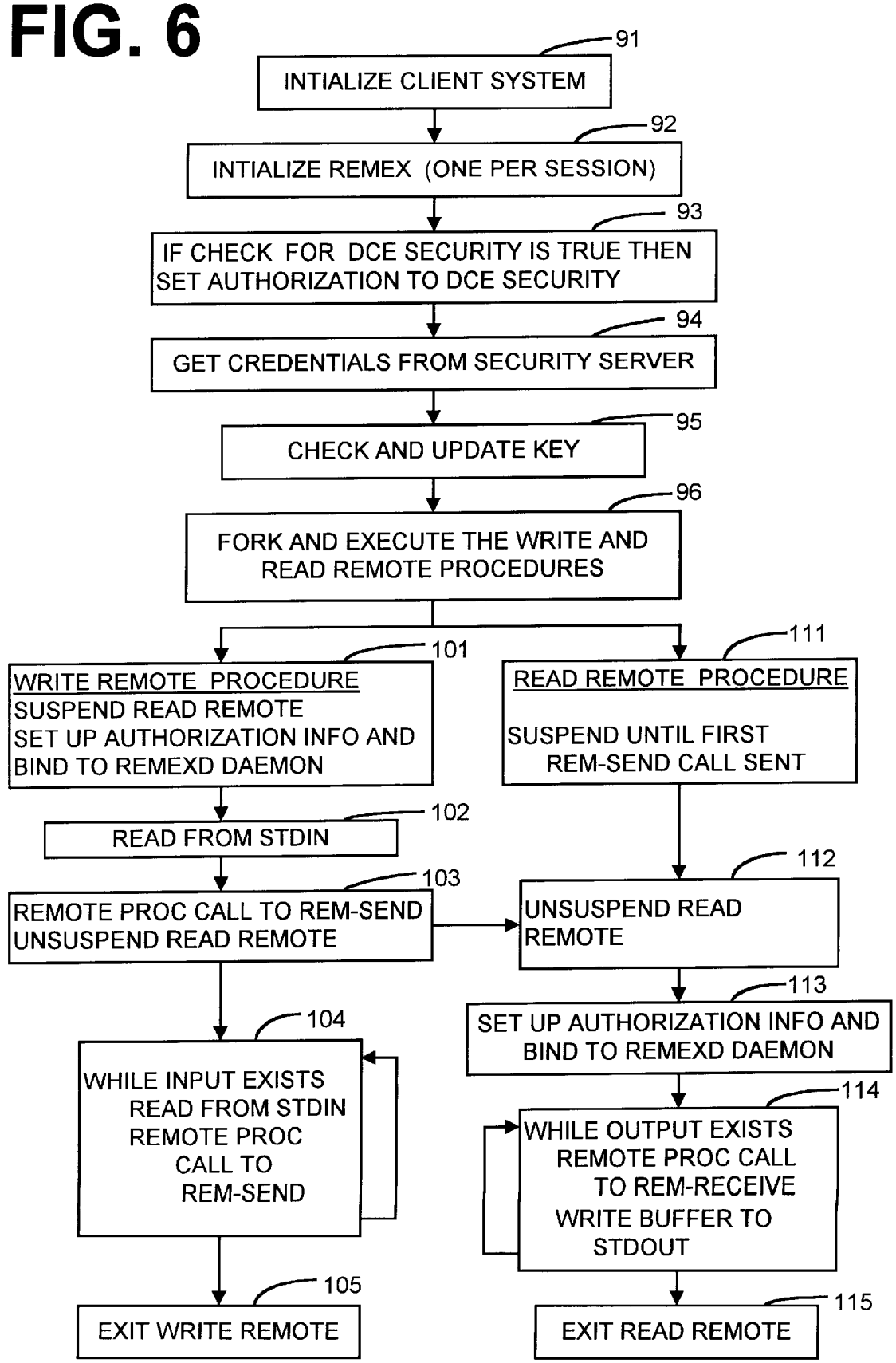
FIG. 6 is a flow chart of the process for the DCE security system operating in the client system of the present invention, shown in FIG. 3.

Illustrated in FIG. 6 is the process for the client system security initialization and security process for remote procedure calls with DCE security. As the client system is initialized in step 91, this includes operating system and all other initialization maintenance program loading. Step 91 also includes the execution of the client application program 21 (FIG. 2).

Upon the client application program 21 execution of a remote procedure call results in the initialization of the remex which is one per session in step 92. After initialization there is a check to see if the security for the remote procedure call is DCE. This is accomplished by the application checking, via a DCE API, whether it's in a configured DCE cell. If so, it then attempts to get a ticket using an internally-derived principal name. If these checks succeed, and it is able to verify its identity with the security server, then the DCE security check is indicated as true. If this is true, then the authorization is set to the DCE security method at step 93, otherwise the process utilizes the method as shown in FIG. 6.

Remex configures DCE Security by doing the following checks. First, it tries to get a current cell name. Second, it tries to get a login identity. Then, there is an attempt to validate the identity from a keytable. Next, remex checks for an expired password and that remex got valid network credentials. Remex tries to certify the login identity, and sets the identity to be the current login context. If all the above works, then a global flag is set indicating the use of DCE Security. If the DCE security flag is set, then authentication is done on the first call of both of the RPCs. The above checks require manual configuration of the client and the target hosts servers to be members of the cell and to have the proper principal names and keytables.

Next, The client obtains its credentials for the security server 13 (FIG. 2) in step 94. The credentials are checked and the encryption key is updated in step 95.

The write and read remote threads are created and executed with the fork command at step 96. The write remote and read remote threadsexecute in parallel and after completion of the remote procedure call, each of the write remote and read remote threadsare terminated.

The write remote thread, upon execution, first suspends the read remote thread, sets up the authorization information and binds to the remexd daemon of the server system at step 101. Next, the write remote thread reads from stdin at step 102.

The write remote thread performs a remote procedure call to rem-send in the server 12 system (FIG. 2) and unsuspends the read remote thread at step 103. At this time, the read remote thread is unsuspended and continues execution, which will be described in later paragraphs. The write remote thread performs reading of the stdin file and remote procedure calling of the rem-sent procedure until input from stdin file is empty at step 104. Once input from stdin is empty, then the write remote thread exits at step 105.

Upon execution of the read remote thread, the read remote thread suspends until the first rem-send call is sent to the server at step 111. This is done because until there is a remote procedure call to the server, there can be no returning of data from this server based on the remote procedure call for service. At which time the write remote thread calls rem-send, the read remote thread unsuspends itself at step 112.

The read remote thread sets up the authorization information and binds itself to the remexd daemon at step 113. While input exists from rem-send in server 12 (FIG. 2), the remote thread continues to output data received from the server to the stdout until output is empty. Then, the read remote thread exits at step 115.

Illustrated in FIG. 7 is the server processing in the instance where DCE security is provided for remote procedure calls. Initialization of the server system is first performed at step 121. Next, the initialization of the remexd daemon is performed at step 122.

The server system then checks to see if DCE security is to be used in the remote procedure calls, and if this check for remote DCE security is true, then the server daemon sets authorization to the DCE security system at step 123. Upon initialization, if remexd finds itself in a DCE cell, it checks for membership and identity following the same sequence as described above for remex. Upon receiving the first RPC of a session, authorization is done in the reference monitor function in DCE terms. The reference monitor uses DCE, to check for the expected level of protection and client principal name. In the DCE mode, authentication is performed for each RPC at the stub level. The server system get its credentials from the security server 13 (FIG. 2) in step 124.

Registration of server services provided are performed at step 125. The remexd daemon manages the end point map or the server step code that communicates directly with the client subcode. The RPC daemon resides at well-known end points so the client can find it and communicate requests for service.

In the initialization, the remexd daemon registration of services provided are performed. Also, registration of the protocol seasons that the server will use for remote procedure calls is also performed. The protocol sequence identifies a single type of communication protocol, for example but not limited to, TCP/IP or UDP/IP. Protocol registration causes the servers to create its end points. The clients get and use these end points to communicate with the server.

The server then advertises its server location to clients by putting the end point information into a directly serviced database, storing the binding information into an application specific database and the creation of an end point map. Then, client applications can register the server address end points in a local end point map, thus enabling the clients stub code to search the end point map to get the proper addresses on the host and communicate directly with them as discussed with regard to FIG. 2.

The server remexd is then suspended until a client binds to a remexd to have services performed at step 127. Once the client binds to the remexd daemon, the remexd daemon forks and executes a receive and send remote thread at step 127.

The send remote thread, upon initialization, checks the authorization of the client at step 131. The send remote thread next return the authorization at step 132.

The send remote thread then creates pipes at step 133. These pipes created at step 133 allow communication from the send remote thread with the service providing the program that actually provides the requested service. The program that provides the requested service is executed at step 134.

While input exists from the client, the send remote thread write takes the data from the buffer received from the client process and writes it to the pipe created in step 135, thereby providing the data to the program that provides the requested service. Once the input from the client write remote thread ceases, the send remote thread closes the pipe to the service providing program, returns statuses to the write remote thread at step 136, exits the send remote thread at step 137, and returns to step 127 to wait for the next client to request service.

The remote thread executed at step 141 initializes, and while output exists from the program that provides the requested service, checks the authorization of the call from the client read remote thread, and writes the data received from the program that provides the requested service to a buffer. This buffer is then returned to the client read remote thread in step 141. As long as there is data output from the program that provides the requested service, step 141 will loop until output from the program that provides the requested service ceases.

Once the output from the program that provides the requested service ceases, the receive remote thread closes the pipe to the program that provides the requested service and returns status to the client read remote thread of FIG. 6 in step 142. The receive remote thread then exits at step 143 and returns to a suspended state, until the next client binds to the remexd daemon at step 127.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An apparatus for remotely executing commands using remote procedure calls in a distributed computing environment (DCE), comprising:

a mechanism for dynamically adapting security methods in the DCE by sensing a security method to be utilized in remote procedure calls between a client computer device and a server computer device, and utilizing the sensed security method in remote procedure calls between the client computer device and the server computer device.

2. The apparatus of claim 1, wherein said dynamically adapting security mechanism further comprises:

a remote procedure call packet generating mechanism that includes host identification and user name packet information in binary form.

3. The apparatus of claim 1, wherein said dynamically adapting security mechanism further comprises:

logic configured for establishing a default security structure when a default security method is sensed in remote procedure calls communications.

4. The apparatus of claim 1, wherein said dynamically adapting security mechanism further comprises:

logic configured for utilizing DCE security when a DCE security method is sensed in remote procedure calls communications.

5. The apparatus of claim 1, wherein said dynamically adapting security mechanism further comprising:

logic configured to provide a shared secret key.

6. The apparatus of claim 5, wherein said shared secret key further comprises:

a pseudo-random number; and a password.

7. The apparatus of claim 1, wherein said dynamically adapting security mechanism further comprises:

logic configured to provide a single system-level authorization file that is root-protected; and logic configured to provide limits to said client computer device access to a single system.

8. A method for use in a computer system for remotely executing commands using remote procedure calls in the distributed computing environment (DCE), the method comprising the steps of:

sensing a security method to be applied as system security method in remote procedure calls between a client computer device and a server computer device; and utilizing the sensed security method in said remote procedure calls communications between the client computer device and the server computer device.

9. The method of claim 8, further including the step of:

generating a remote procedure call packet that includes host identification and user name packet information in binary form.

10. The method of claim 8, further including the step of:

establishing a default security structure when a default security method is sensed in remote procedure calls communications.

11. The method of claim 8, further including the step of:

authorizing DCE security when a DCE security method is utilized.

12. The method of claim 8, further including the step of:

providing a shared secret key.

13. The method of claim 12, wherein said shared secret key further comprises:

a pseudo-random number; and a password.

14. The method of claim 8, further including the step of:

providing a single system-level authorization file that is root-protected; and providing limits to client computer device access to a single system.

15. An apparatus for remotely executing commands using remote procedure calls in the distributed computing environment (DCE), comprising:

means for providing dynamically adapting security methods for remote procedure calls in a distributed computing environment;

means for sensing a security method to be applied as sensed system security; and means for utilizing the sensed system security in remote procedure calls communications between a client device and a server device.

16. The apparatus of claim 15, wherein said dynamically adapting security providing means further comprises:

means for generating a remote procedure calls packet that includes host identification and user name packet information in binary form.

17. The apparatus of claim 15, wherein said dynamically adapting security providing means further comprises:

means for establishing a default security structure when a default security method is sensed in remote procedure calls communications.

18. The apparatus of claim 15, wherein said dynamically adapting security providing means further comprises:

means for authorizing DCE security when a DCE security method is utilized.

19. The apparatus of claim 15, wherein said dynamically adapting security providing means further comprises:

means for providing a shared secret key.

20. The apparatus of claim 19, wherein said shared secret key further comprises:

a pseudo-random number; and a password.

21. The apparatus of claim 15, wherein said dynamically adapting security providing means further comprises:

means for providing a single system-level authorization file that is root-protected; and means for providing limits to client access to a single system.

* * * * *